United States Patent [19]

Green

[11] Patent Number: 4,552,604

[45] Date of Patent: * Nov. 12, 1985

[54] BONDING METHOD EMPLOYING FILM ADHESIVES

[75] Inventor: George E. Green, Stapleford, England

[73] Assignee: Ciba Geigy Corporation, Ardsley, N.Y.

[*] Notice: The portion of the term of this patent subsequent to May 30, 1995 has been disclaimed.

[21] Appl. No.: 153,390

[22] Filed: May 27, 1980

Related U.S. Application Data

[63] Continuation of Ser. No. 871,052, Jan. 20, 1978, abandoned.

[30] Foreign Application Priority Data

Feb. 2, 1977 [GB] United Kingdom ............... 04170/77

[51] Int. Cl.$^4$ .......................................... B29C 19/00
[52] U.S. Cl. ................... 156/246; 156/273.3; 156/275.5; 156/275.7; 156/306.9; 156/330; 204/159.11; 204/159.14; 204/159.15; 427/44; 427/53.1; 427/54.1; 427/208.2; 427/386; 428/345; 428/415; 428/416
[58] Field of Search ...................... 156/272, 330, 306.9, 156/246; 204/159.11, 159.14, 159.15; 428/345, 416, 415; 427/44, 208.2, 53.1, 386, 54.1

[56] References Cited

U.S. PATENT DOCUMENTS

| | | | |
|---|---|---|---|
| 3,373,075 | 3/1968 | Fekete et al. | 156/330 |
| 3,418,189 | 12/1968 | Grosneim | 156/277 |
| 3,935,330 | 1/1976 | Smith et al. | 204/159.15 |
| 3,989,610 | 11/1976 | Tsukada et al. | 427/54.1 |
| 4,072,592 | 2/1978 | Dué et al. | 204/159.15 |
| 4,076,869 | 2/1978 | Flynn | 427/386 |
| 4,092,443 | 5/1978 | Green | 427/53.1 |
| 4,203,792 | 5/1980 | Thompson | 156/272 |
| 4,246,298 | 1/1981 | Guarnery et al. | 427/386 |

*Primary Examiner*—John J. Gallagher
*Attorney, Agent, or Firm*—Harry Falber

[57] ABSTRACT

A process for bonding surfaces together comprises (i) exposing to actinic radiation a layer of a liquid composition containing an epoxide resin, photopolymerizable compound, and a heat-activated curing agent for epoxide resins until the composition solidifies to form a film adhesive while the epoxide resin remains substantially heat-curable, (ii) sandwiching the film adhesive between the surfaces to be bonded, and (iii) then heating the assembly so that the epoxide resin component of the film adhesive is cured.

Surfaces which may be so bonded may be metal, glass, ceramic, or wood.

9 Claims, No Drawings

BONDING METHOD EMPLOYING FILM ADHESIVES

This is a continuation of application Ser. No. 871,052, filed Jan. 20, 1978, now abandoned.

BACKGROUND OF THE INVENTION

This invention relates to the use of adhesives in film form, commonly called "film adhesives", containing epoxide resins.

Structural adhesive bonding is a well established procedure in the manufacture of aircraft and in similar industries. Adhesives employed for this purpose are often used in the form of solid films, thereby eliminating difficulties which may occur when a liquid adhesive is used, such as evaporation of a solvent, loss of adhesive from the required site, and uneven distribution. Epoxide resins have a high reputation as adhesives, and are convenient to use in film form.

Conventionally, film adhesives are prepared either by a technique involving evaporation of a solvent or by extrusion. In the former method, a resin composition is dissolved in a volatile solvent and the solution is poured onto a flat surface: the solvent is then allowed or caused to evaporate, leaving a film of the composition. In the latter method, the resin composition is heated to its melting point, extruded through a narrow slit, and then cooled or allowed to cool. While one or the other of these methods is suitable for making a film adhesive from many kinds of resin they are unsuitable for making a film adhesive out of an epoxide resin which is both substantially insoluble in volatile solvents and not readily fusible, such as one in the B-stage or an advanced resin of very high molecular weight. They are also unsuitable for use with compositions in which a latent curing effect is achieved by using discrete particles of a solid epoxide resin and discrete particles of a solid hardener, the resin and hardener not reacting together whilst the components are in particulate form but starting to cure as soon as the components are brought into intimate contact by being dissolved in a solvent or by being fused together. Extrusion methods also suffer from the disadvantage that the advancement of the resin which may result can shorten the shelf-life of the film and lead to the premature gelation of the resin composition. Use of solvents may introduce toxicity, flammability, or pollution problems.

DETAILED DISCLOSURE

A method has now been found in which there is used a film adhesive which may be prepared from an epoxide resin without causing excessive advancement of that resin; the shelf-life of the film adhesive is thus dependent only upon the nature of the resin and hardener, and not upon the mode of its manufacture. Further, the use of solvent is not generally necessary.

In this novel method, a liquid composition, containing an epoxide resin and a photopolymerisable compound, is photopolymerised to form an essentially solid continuous film by exposure to actinic radiation, optionally in the presence of a catalyst for the photopolymerisation, but without thermally crosslinking it; the film so obtained is then used to bond surfaces together by the application of heat and, if desired, pressure. The period of heating can be very short, as there need be no solvent to evaporate and the film need not be thick, typically 20 to 250 μm.

The present invention accordingly provides a method for bonding together two surfaces selected from metals, glass, ceramics, and wood which comprises (i) in the absence of a substance which gives rise to a substantial degree of photoinduced polymerisation through consumption of epoxide groups, exposing to actinic radiation a layer of a liquid composition containing an epoxide resin, a photopolymerisable compound (other than an epoxide resin), and a heat-activated curing agent for epoxide resins until the said composition solidifies to form an essentially solid continuous film due to photopolymerisation of the said photopolymerisable compound while the epoxide resin remains substantially in the thermosettable state, and then (ii) sandwiching between, and in contact with, the two surfaces the film so formed and heating the assembly to cure the epoxide resin.

There are also provided articles having surfaces bonded by the method of this invention.

Compositions used to prepare the films of the present invention must, as indicated, be liquid under the conditions used in making the films but are preferably solvent-free.

Epoxide resins, i.e., substances containing more than one 1,2-epoxide group per average molecule, suitable for use in the present invention are preferably those containing groups of formula

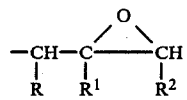

directly attached to atoms of oxygen, nitrogen, or sulphur, where either R and $R^2$ each represent a hydrogen atom, in which case $R^1$ denotes a hydrogen atom or a methyl group, or R and $R^2$ together represent —$CH_2CH_2$—, in which case $R^1$ denotes a hydrogen atom.

As examples of such resins may be mentioned polyglycidyl and poly(β-methylglycidyl) esters obtainable by reaction of a compound containing two or more carboxylic acid groups per molecule with epichlorohydrin, glycerol dichlorohydrin, or β-methylepichlorohydrin in the presence of an alkali. Such polyglycidyl esters may be derived from aliphatic polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(β-methylglycidyl)ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)-glycols, propane-1,2-diol and poly(oxypropylene)-glycols, propane-1,3-diol, butane-1,4-diol, poly(oxytetramethylene)glycols, pentane-1,5-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)-aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrakis(4-hydroxyphenyl)ethane, 2,2-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, and bis(4-methylaminophenyl)-methane; triglycidyl isocyanurate; and N,N'-diglycidyl derivatives of cyclic alkylene ureas, such as ethyleneurea and 1,3-propyleneureas, and of hydantoins such as 5,5-dimethylhydantoin. N-Glycidyl compounds are not preferred if either the photopolymerisation catalyst or the thermal crosslinking agent is a Lewis acid.

Examples of poly(S-glycidyl) compounds are di-S-glycidyl derivatives of dithiols such as ethane-1,2-dithiol and bis(4-mercaptomethylphenyl)ether.

Examples of epoxide resins having groups of formula I where R and $R^2$ conjointly denote a —$CH_2CH_2$— group are bis(2,3-epoxycyclopentyl)ether, 2,3-epoxycyclopentyl glycidyl ether, and 1,2-bis(2,3-epoxycyclopentyloxy)ethane.

Epoxide resins having 1,2-epoxide groups attached to different kinds of hetero atoms may be employed, e.g., the N,N,O-triglycidyl derivative of 4-aminophenol, the glycidyl ether-glycidyl ester of salicylic acid, N,-glycidyl-N'-(2-glycidyloxypropyl)-5,5-dimethylhydantoin, and 2-glycidyloxy-1,3-bis(5,5-dimethyl-1-glycidylhydantoin-3-yl)propane.

Epoxide resins in which some or all of the epoxide groups are not terminal may also be employed, such as vinylcyclohexene dioxide, limonene dioxide, dicyclopentadiene dioxide, 4-oxatetracyclo[6.2.1.0$^{2,7}$.0$^{3,5}$]undec-9-yl glycidyl ether, the bis(4-oxatetracyclo[6.2.1.0$^{2,7}$.0$^{3,5}$]undec-9-yl)ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, 3-(3,4-epoxycyclohexyl)-8,9-epoxy-2,4-dioxaspiro[5,5]undecane, and epoxidised butadienes or copolymers of butadiene with ethylenic compounds such as styrene and vinyl acetate.

If desired, a mixture of epoxide resins may be used.

Especially preferred epoxide resins, which may have been advanced, for the process of this invention are diglycidyl ethers of dihydric phenols such as 2,2-bis(4-hydroxyphenyl)propane and bis(4-hydroxyphenyl)methane and of dihydric alcohols such as of butane-1,4-diol, and N,N'-diglycidyl derivatives of hydantoins, such as 1,3-diglycidyl-5,5-dimethylhydantoin.

The photopolymerisable compound used in the process of the present invention may be of any chemical type known to polymerise under the influence of actinic radiation. Such materials are described in, for example, Kosar, "Light-sensitive Systems: Chemistry and Applications of Non-Silver Halide Photographic Processes", Wiley, New York, 1965.

As is well known, these materials fall into two main classes
(a) those which are polymerised through a free-radical chain reaction (photoinitiated polymerisation) and
(b) those in which polymerisation is effected by reaction of an excited molecule of the monomer with an unexcited molecule of the monomer.

The first type require only one photopolymerisable group per molecule to form long chains on polymerisation while the second type must have at least two photopolymerisable groups per molecule, since if they have only one such group per molecule they will dimerise, but not polymerise on irradiation.

Photopolymerisable substances of the first type preferred for use in this invention have one ethylenic linkage, or more than one providing they are unconjugated. Examples of these substances are acrylic esters containing at least one group of the general formulae II, III, or IV

$$CH_2=C(R^3)COO— \qquad \qquad II$$

$$[CH_2=C(R^3)CONH]_2CHCOO— \qquad III$$

$$CH_2=C(R^3)CONHCH(OH)CH_2COO— \qquad IV$$

where $R^3$ is a hydrogen, chlorine, or bromine atom, or an alkyl hydrocarbon group of 1 to 4 carbon atoms, especially a hydrogen atom or a methyl group. Groups of formulae II to IV may be attached directly to carbon atoms of e.g., radicals of from 5 to 50 carbon atoms. More specific examples of acrylic esters are 2,2-dimethylpropane-1,3-diol diacrylate and the esters of formulae XVI to XX below. Other examples of substances of the first type are styrene and crotonic acid.

Photopolymerisable materials of the second type include those having at least two, and preferably three or more, groups which are azido, coumarin, stilbene, maleimide, pyridinone, chalcone, propenone, pentadienone, or acrylic acid groups which are substituted in their 3-position by groups having ethylenic unsaturation or aromaticity in conjugation with the ethylenic double bond of the acrylic group.

Examples of suitable azides are those containing at least two groups of the formula

$$N_3—Ar— \qquad \qquad V$$

where Ar denotes a mononuclear or dinuclear divalent aromatic radical containing in all from 6 to at most 14 carbon atoms, especially a phenylene or naphthylene group.

Examples of suitable coumarins are those containing groups of the formula

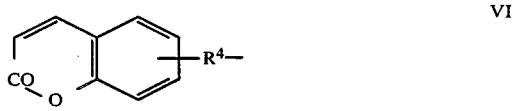
VI where $R^4$ is an oxygen atom, a carbonyloxy group (—COO—), a sulphonyl group, or a sulphonyloxy group.

Examples of those containing stilbene groups are those containing groups of the formula

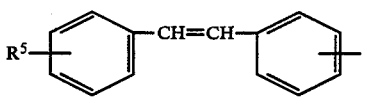
VII where $R^5$ is the residue, containing up to 8 carbon atoms in all, of a five or six-membered nitrogen-containing heterocyclic ring, fused to a benzene or naphthalene nucleus, and linked through a carbon atom of the said heterocyclic ring adjacent to a nitrogen hetero atom thereof to the indicated benzene nucleus, such as a benzimidazolyl, benzoxazolyl, benzotriazolyl, benzothiazolyl, or a naphthotriazolyl residue.

Examples of those containing maleimide units are those having groups of the formula

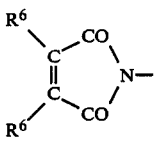
VIII where each $R^6$ is an alkyl group of 1 to 4 carbon atoms, a chlorine atom, or a phenyl group, and especially a methyl group.

Examples of those containing pyridinone units are those having groups of the formula

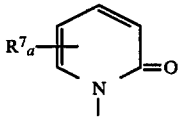
IX where
$R^7$ is an aliphatic or cycloaliphatic radical of 1 to 8 carbon atoms, and
a is zero or an integer of 1 to 4.

Examples of compounds containing chalcone, propenone, and pentadienone groups are those containing structures of formula

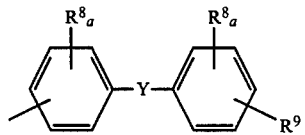
X or

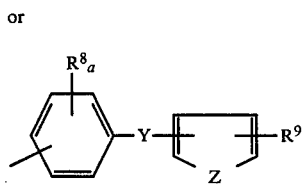
XI where
each $R^8$ is a halogen atom, or an alkyl, cycloalkyl, alkenyl, cycloalkenyl, alkoxy, cycloalkoxy, alkenoxy, cycloalkenoxy, carbalkoxy, carbocycloalkoxy, carbalkenoxy, or carbocycloalkenoxy group, such organic groups containing 1 to 9 carbon atoms, or is a nitro group, or a carboxyl, sulphonic, or phosphoric acid group in the form of a salt,
a has the meaning previously assigned,
$R^9$ represents a valency bond or a hydrogen atom,
Y represents a grouping of formula

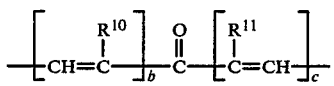
XII or

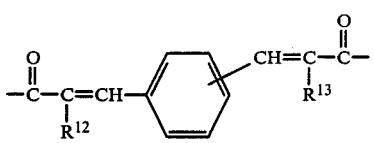
XIII or

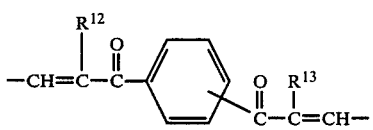
XIV $R^{10}$ and $R^{11}$ are each individually a hydrogen atom, an alkyl group, e.g., of 1 to 4 carbon atoms, or an aryl group, preferably a mononuclear group such as a phenyl group, or $R^{10}$ and $R^{11}$ conjointly denote a polymethylene chain of 2 to 4 methylene groups,
$R^{12}$ and $R^{13}$ are each a hydrogen atom, an alkyl group, e.g., of 1 to 4 carbon atoms, or an aryl group which is preferably a mononuclear group such as a phenyl group,
b and c are each zero, 1, or 2, with the proviso that they are not both zero, and
Z is an oxygen or sulphur atom.

Suitable 3-substituted acrylates contain groups of the general formula $$R^{14}CH=C(R^3)COO— \qquad XV$$

where
$R^{14}$ is an aliphatic or mononuclear aromatic, araliphatic, or heterocyclyl group which, as already indicated, has ethylenic unsaturation or aromaticity in conjugation with the ethylenic double bond shown, such as a phenyl, 2-furyl, 2- or 3-pyridyl, prop-2-enyl, or styryl group, and
$R^3$ has the meaning previously assigned.

Specific examples are disorbates of poly(oxyethylene)glycols and poly(oxypropylene)glycols.

If desired, a mixture of photopolymerisable compounds may be used.

Especially preferred photopolymerisable compounds used in the process of this invention are, as already mentioned, 2,2-dimethylpropane-1,3-diol diacrylate and esters of acrylic acid which are of any of the following general formulae XVI to XX.

Formula XVI is

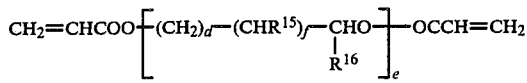

where
d is an integer of 1 to 8,
e is an integer of 1 to 20,
f is zero or 1,
$R^{15}$ denotes —H, —OH, or —OOCCH=CH$_2$, and
$R^{16}$ denotes —H, —CH$_3$, —C$_2$H$_5$, —CH$_2$OH, or —CH$_2$OOCCH=CH$_2$.

Examples of compounds of formula XVI are triethylene glycol diacrylate and tetraethylene glycol diacrylate.

Formula XVII is

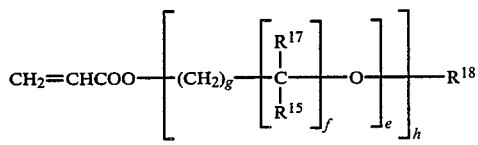

where
e, f, and $R^{15}$ have the meanings assigned above,
g is zero or a positive integer, provided that f and g are not both zero,
h is 1, 2, 3, or 4,
$R^{17}$ denotes —H, —Cl, —CH$_3$, or —C$_2$H$_5$, and
$R^{18}$ denotes an organic radical of valency h linked through a carbon atom or carbon atoms thereof to the indicated h terminal oxygen atom or atoms, preferably the hydrocarbon residue of an aliphatic alcohol containing from 1 to 6 carbon atoms, such as —CH$_3$ or

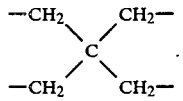

Formula XVIII is

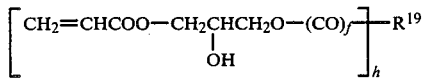

where
f and h have the meanings previously assigned and
$R^{19}$ denotes an organic radical of valency h, linked through a carbon atom thereof other than the carbon atom of a carbonyl group.

More particularly, when f is zero, $R^{19}$ may denote the residue, containing from 1 to 18 carbon atoms, of an alcohol or phenol having h hydroxyl groups.

$R^{19}$ may thus represent, for example an aromatic group (which may be substituted in the ring by alkyl groups), an araliphatic, cycloaliphatic, heterocyclic, or heterocycloaliphatic group, such as an aromatic group containing only one benzene ring, optionally substituted by chlorine or by alkyl groups each of from 1 to 9 carbon atoms, or an aromatic group comprising a chain of two benzene rings, optionally interrupted by ether oxygen atoms, aliphatic hydrocarbon groups of 1 to 4 carbon atoms, or sulphone groups, each benzene ring being optionally substituted by chlorine or by alkyl groups each of from 1 to 6 carbon atoms, or, preferably, a saturated or ethylenically unsaturated, straight or branched-chain aliphatic group, which may contain one or more ether oxygen linkages and which may be substituted by one or more hydroxyl groups, especially a saturated or monoethylenically-unsaturated straight chain aliphatic hydrocarbon group of from 1 to 8 carbon atoms.

Specific examples of such groups are the aromatic groups of the formulae —C$_6$H$_5$ and —C$_6$H$_4$CH$_3$, in which case h is 1, —C$_6$H$_4$C(CH$_3$)$_2$C$_6$H$_4$—, and —C$_6$H$_4$CH$_2$C$_6$H$_4$—, in which case h is 2, and

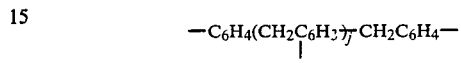

where j is 1 or 2, in which case h is 3 or 4, and the aliphatic groups of formula

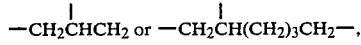

in which case h is 3, of formula —(CH$_2$)$_4$—, —CH$_2$CH=CHCH$_2$—, —CH$_2$CH$_2$OCH$_2$CH$_2$—, or -(CH$_2$CH$_2$O)$_2$CH$_2$CH$_2$—, in which case h is 2, or of the formula —(CH$_2$)$_3$CH$_3$, —(CH$_2$)$_4$OH, —CH$_2$CH=CH$_2$, —(CH$_2$)$_2$OH, —CH$_2$CH(CH$_3$)OH, or —CH$_2$CH=CHCH$_2$OH, in which case h is 1.

When f is 1, $R^{19}$ may represent the residue, containing from 1 to 60 carbon atoms, of an acid having h carboxyl groups, preferably a saturated or ethylenically-unsaturated, straight chain or branched aliphatic hydrocarbon group of from 1 to 20 carbon atoms, which may be substituted by one or more chlorine atoms and which may be interrupted by one or more ether oxygen atoms and/or by one or more carbonyloxy groups, or a saturated or ethylenically-unsaturated cycloaliphatic or aliphatic-cycloaliphatic hydrocarbon group of at least 4 carbon atoms, which may be substituted by chlorine atoms, or an aromatic hydrocarbon group of from 6 to 12 carbon atoms, which may be substituted by chlorine atoms. Further preferred are such compounds in which $R^{19}$ represents a saturated or ethylenically-unsaturated straight chain or branched aliphatic hydrocarbon group of from 1 to 8 carbon atoms, optionally substituted by a hydroxyl group, or a saturated or ethylenically-unsaturated straight chain or branched aliphatic hydrocarbon group of from 4 to 50 carbon atoms and interrupted in the chain by carbonyloxy groups, or a saturated or ethylenically-unsaturated monocyclic or dicyclic cycloaliphatic hydrocarbon group of 6 to 8 carbon atoms, or an ethylenically-unsaturated cycloaliphatic-aliphatic hydrocarbon group of from 10 to 51 carbon atoms, or a mononuclear aromatic hydrocarbon group of from 6 to 8 carbon atoms.

Specific examples of these residues of carboxylic acids are those of the formula —CH$_3$, —CH$_2$CH$_3$, —CH$_2$CH(OH)CH$_3$, —CH$_2$Cl, and —C$_6$H$_5$, in which case h is 1, and —CH$_2$CH$_2$—, —CH=CH—, and —C$_6$H$_4$—, in which case h is 2.

Specific examples of suitable compounds of formula XVIII are 1,4-bis(2-hydroxy-3-(acryloyloxy)propoxy)-butane, a poly(2-hydroxy-3-(acryloyloxy)propyl)ether of a phenol-formaldehyde novolak, 1-(2-hydroxy-3-acryloyloxypropoxy)-butane, -n-octane, and -n-decane, bis(2-hydroxy-3-acryloyloxypropyl)adipate, 2-hydroxy-3-acryloyloxypropyl propionate and 3-phenoxy-2-hydroxypropyl acrylate.

Formula XIX is $$R^{20}C(CH_2OOCCH=CH_2)_3$$

where $R^{20}$ denotes $CH_3-$, $C_2H_5-$, or $CH_2=CHCOOCH_2-$

Examples of such acrylates are pentaerythritol tetraacrylate and 1,1,1-trimethylolpropane triacrylate.

Formula XX is $$CH_2=CHCOOR^{21}$$

where $R^{21}$ denotes either an alkyl group of 1 to 6 carbon atoms, optionally substituted by one hydroxyl group, such as an ethyl, n-propyl, n-butyl, 2-hydroxyethyl, or 2-hydroxypropyl group, or a dialkylaminoalkyl group containing in all 3 to 12 carbon atoms, such as a diethylaminoethyl group.

The molar ratio of epoxide resin to photopolymerisable compound is such that there is sufficient of each present to form both a satisfactory film adhesive and a satisfactorily cured bond between the two surfaces to be bonded. Usually the molar ratio is from 10:1 to 1:10, and especially from 5:1 to 1:5.

The photopolymerisable compound may be free from any 1,2-epoxide group. On the other hand, the liquid composition used may also contain a substance having in the same molecule at least one 1,2-epoxide group and at least one dissimilar (i.e., not 1,2-epoxide) group through which the substance can be polymerised by means of actinic radiation (called hereinafter a "dual-functional substance").

Suitable dual-functional substances may be made by introducing photopolymerisable groups (i.e., groups through which polymerisation can be induced by means of actinic radiation) into a compound which already contains one or more 1,2-epoxide groups or, conversely, by introducing one or more 1,2-epoxide groups into a compound which already contains one or more photopolymerisable groups.

A convenient method of introducing photopolymerisable groups into a compound which already contains epoxide groups comprises reaction of an at least diepoxide with a stoichiometric deficit, based on the epoxide group content, of a compound containing both a photopolymerisable group and also a group, such as a carboxylic acid, phenolic or alcoholic hydroxyl, or imido group, capable of reaction with a 1,2-epoxide group so as to introduce at least one photopolymerisable group into the molecule.

It will be understood that this method does not usually give rise to more than a 50% of dual-functional material. Thus, taking acrylic acid as an example of a compound containing both a group through which it can be polymerised (the ethylenic unsaturation) and a group capable of reaction with a 1,2-epoxide group (the carboxylic acid groups), reaction of a diepoxide with 0.5 mol of acrylic acid per epoxide group affords a product which, on a statistical basis, can be considered to comprise 50 mol-% of the epoxide-acrylate, 25 mol-% of the diacrylate, and 25 mol-% of unchanged diepoxide. Clearly, with lesser or greater amounts of acrylic acid, there would be obtained lesser or greater amounts of the diacrylate and the diepoxide but a lesser amount of the epoxide-acrylate. The dual-functional material is, of course, accompanied by both a photopolymerisable material (the diacrylate in this case) and unchanged diepoxide.

Usually, from 10 to 50 mol-% of the dual-functional material is employed, calculated on the combined mols. of epoxide resin the said photopolymerisable compound, and the dual-functional material.

Examples of classes of compounds containing a photopolymerisable group and also a carboxylic acid group are acrylic, and acrylamido-substituted carboxylic, acids; azidoaromatic acids; carboxyl-substituted stilbene derivatives such as stilbenebenzimidazoles, stilbenebenzoxazoles, stilbenebenzotriazoles, stilbenenaphthotriazoles, and stilbenebenzothiazoles; carboxyl-containing maleimides, where the two ethylenic carbon atoms of the maleimide ring are substituted by alkyl groups of 1 to 4 carbon atoms, phenyl groups, or chlorine atoms; and also acrylic acids substituted in the 3-position by groups having ethylenic unsaturation or aromaticity in conjugation with the ethylenic bond in the 2,3-position.

Examples of classes of compound containing a photopolymerisable group and also a phenolic hydroxyl group are hydroxy-substituted chalcones and hydroxyphenyl-substituted propenones and pentadienones. Examples of classes of compounds containing a photopolymerisable group and also an alcoholic hydroxyl group are hydroxy-substituted maleimides and hydroxy-substituted pyridinones. Examples of classes of compounds containing a photopolymerisable group and an imido group are disubstituted maleimides, where the two ethylenic carbon atoms of the maleimide ring are substituted as specified above.

Suitable acrylic, and acrylamido-substituted carboxylic, acids are of the general formula $$CH_2=C(R^3)COOH \qquad XXI$$

or $$[CH_2=C(R^3)CONH]_2CHCOOH \qquad XXII$$

or $$CH_2=C(R^3)CONHCH(OH)CH_2COOH \qquad XXIII$$

where $R^3$ has the meaning previously assigned.

Suitable azidoaromatic acids are 4-azidobenzoic acid and other compounds of formula $$N_3-Ar-COOH \qquad XXIV$$

where Ar has the meaning previously assigned.

Suitable carboxyl-containing stilbene derivatives are 4-(1-methylbenzimidazol-2-yl)stilbene-4'-carboxylic acid, 4-(2H-naphtho[1,2-d]triazol-2-yl)stilbene-4'-carboxylic acid, and other compounds of the general formula

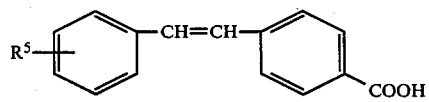

XXV where $R^5$ has the meaning previously assigned.

Suitable carboxyl-containing maleimides are N-(carboxyphenyl)-dimethylmaleimide and other compounds of the general formula

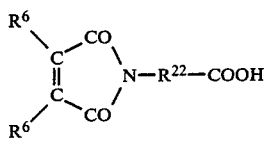

where
each $R^6$ has the meaning previously assigned and $R^{22}$ denotes the residue, containing up to 8 carbon atoms, of an aromatic, aliphatic, or cycloaliphatic aminocarboxylic acid after removal of a primary amino group and a carboxylic acid group.

Suitable hydroxy-substituted chalcones and hydroxyphenyl-substituted propenones and pentadienones are 1-(4-hydroxyphenyl)-3-oxo-3-phenylprop-1-ene, 1-(4-hydroxyphenyl)-1-oxo-3-phenylprop-2-ene, 1-(2-furyl)-3-oxo-3-(4-hydroxyphenyl)prop-1-ene, and other compounds of the general formula

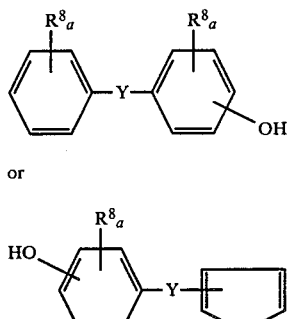

where
each $R^8$, a, Y, and Z have the meanings previously assigned.

Suitable hydroxy-substituted maleimides and hydroxy-substituted pyridinones are N-(2-hydroxyethyl)-dimethylmaleimide, 4,6-dimethyl-1-(2-hydroxyethyl)-pyridin-2-one, and other compounds of the general formula

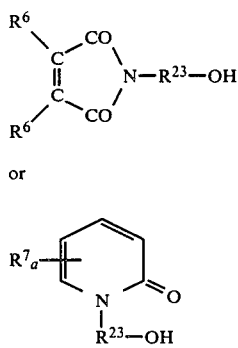

where
each $R^6$, $R^7$, and a have the meaning previously assigned and
$R^{23}$ denotes the residue, of not more than 8 carbon atoms, of an aliphatic or cycloaliphatic aminoalcohol after removal of an amino group and an alcoholic hydroxyl group.

Suitable imides are dimethylmaleimide and other compounds of the general formula

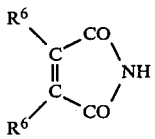

where each $R^6$ has the meaning previously assigned.
Suitable 3-substituted acrylic acids are of formula

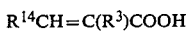

where $R^3$ and $R^{14}$ have the meaning previously assigned.

Polyepoxides which may be employed to react with the phenolic or alcoholic hydroxyl, carboxylic acid, or imido groups are preferably those containing groups of formula I.

As examples of such polyepoxides may be mentioned the epoxide resins listed above as suitable components in the resin compositions used in the process of this invention.

Reaction may be effected in the absence or presence of a solvent and at ambient or elevated temperatures, preferably at 50° to 150° C. A catalyst, such as a quaternary ammonium compound, a tertiary amine, a thioether, or a sulphonium salt, is usually added, as is a free radical inhibitor such as hydroquinone.

Typical such dual-functional substances are described in U.S. Pat. No. 3,450,613 and in West German Offenlegungsschrift No. 2,342,407.

The preferred dual-functional substances hence contain in the same molecule at least one group of formula I directly attached to an oxygen, nitrogen, or sulphur atom, and at least one group of formula

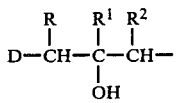

directly attached to an oxygen, nitrogen, or sulphur atom,
where
R, $R^1$, and $R^2$ are as hereinbefore defined, and
L is the monovalent photopolymerisable residue of a substance after removal of a hydrogen atom attached directly to an oxygen, nitrogen, or sulphur atom, such as a group of any of formulae II to XI and XV.

Preferred groups L include any of formulae II to IV and VI, and the following formulae $$N_3-Ar-COO- \qquad \text{XXXIV}$$

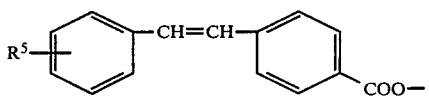

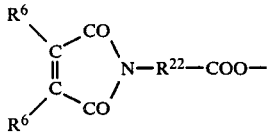

-continued

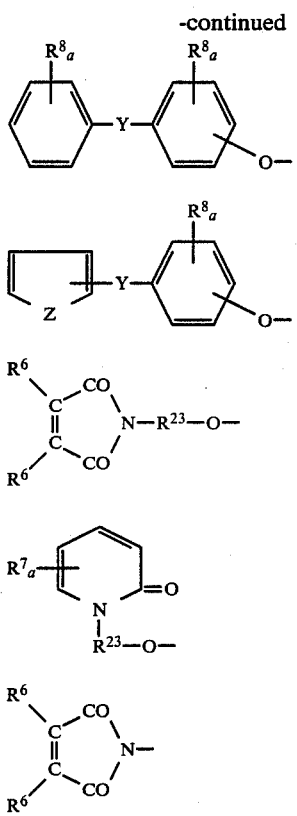

and

R$^{14}$CH=C(R$^3$)COO—    XLII where Ar, R$^5$, R$^6$, R$^7$, R$^8$, R$^{14}$, R$^{22}$, R$^{23}$, a, b, Y, and Z have the meanings previously assigned.

Another method of making dual-functional compounds, by introducing an epoxide group or groups into a compound having at least one photopolymerisable group, comprises utilising one which has also at least one alcoholic or phenolic hydroxyl, or a carboxyl, group and treating it such that the group or groups is or are converted into 1,2-epoxide group or groups, using methods known in the art of epoxide resins for converting hydroxyl or carboxyl groups into glycidyl ether or ester groups. For example, the compound is caused to react with epichlorohydrin in the presence of a hydrogen chloride acceptor (usually a strong base, e.g. NaOH) and preferably of a catalyst such as a quaternary ammonium compound, a tertiary amine, a thioether, or a sulphonium salt. Usually an excess of epichlorohydrin over the theoretical quantity required is employed, the excess serving as solvent for the reaction, which is normally carried out at a temperature of 30° to 120° C., preferably 40° to 65° C., and usually under reduced pressure in order to remove the water formed during the reaction.

Examples of dual-functional substances so obtainable are glycidyl esters of formula

CH$_2$=C(R$^3$)COOCH$_2$CH——CH$_2$    XLIII and

-continued

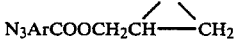
R$^{14}$CH=C(R$^3$)COOCH$_2$CH——CH$_2$    XLIV where R$^3$ and R$^{14}$ each have the meanings previously assigned, such as glycidyl acrylate, methacrylate, cinnamate, 3-(2-furyl)-acrylate, and sorbate.

Examples of other dual-functional substances similarly obtainable are glycidyl esters of azidoaromatic acids, of formula N$_3$ArCOOCH$_2$CH——CH$_2$    XLV where Ar has the meaning previously assigned, and glycidyl ethers of monohydroxyphenyl chalcones and chalcone-like substances, having the general formula

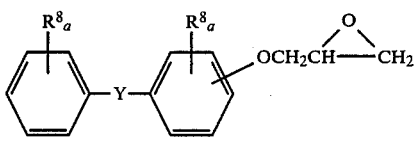

or

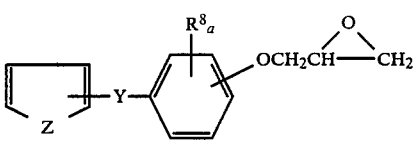

where R$^8$, Y, Z, and a, have the meanings previously assigned. Preferably the photopolymerisable compound is irradiated in the presence of a photopolymerisation catalyst. Suitable catalysts are well known and are described in, for example, the book by Kosar cited above.

Like the photopolymerisable compounds, the catalysts fall into two main classes (a) those which, on irradiation, give an excited state that leads to formation of free radicals which then initiate polymerisation of the photopolymerisable monomer (photoinitiators) and (b) those which, on irradiation, given an excited state which in turn transfers its excitation energy to a molecule of the monomer, giving rise to an excited monomer which then crosslinks with an unexcited molecule of the photopolymerisable monomer (photosensitisers). The first class includes organic peroxides and hydroperoxides, α-halogen substituted acetophenones such as 2,2,2-trichloro-4'-tert-.butylacetophenone, benzoin and its alkyl ethers, e.g., the n-butyl ether, benzophenones, O-alkoxycarbonyl derivatives of an oxime of benzil or of 1-phenylpropane-1,2-dione, such as benzil(O-ethoxycarbonyl)α-monoxime and 1-phenylpropane-1,2-dione-2-(O-ethoxycarbonyl)oxime, benzil acetals, e.g., its dimethyl acetal, and mixtures of phenothiazine dyes (e.g., methylene blue) or quinoxalines (e.g., metal salts of 2-(m- or p-methoxyphenyl)quinoxaline-6'- or 7'-sulphonic acids) with electron donors such as sodium benzenesulphinate or other sulphinic acid or a salt thereof, an arsine, a phosphine, or thiourea (photoredox systems), these initiators being used with photopolymerisable compounds of the first type, especially those containing at least one group of the general formula II, III, or IV.

The second class includes 5-nitroacenaphthene, 4-nitroaniline, 2,4,7-trinitro-9-fluorenone, 3-methyl-1,3-diaza-1,9-benzanthrone, and bis(dialkylamino)benzophenones, especially Michler's ketone, i.e., bis(p-dimethylamino)benzophenone.

Suitable photopolymerisation catalysts are readily found by routine experimentation. The catalyst must not, of course, give rise to a substantial degree of photoinduced polymerisation through consumption of epoxide groups nor should any other substance present: further, the photopolymerisation catalyst must not cause curing of the epoxide resin such that the epoxide resin does not remain substantially thermosettable.

Generally, 0.1 to 20%, and preferably 0.5 to 15%, by weight of the photopolymerisation catalyst is incorporated, based on the combined weight of the photopolymerisable compound and, if used, the dual-functional substance.

In the photopolymerising step actinic radiation of wavelength 200–600 nm is preferably used. Suitable sources of actinic radiation include carbon arcs, mercury vapour arcs, fluorescent lamps with phosphors emitting ultraviolet light, argon and xenon glow lamps, tungsten lamps, and photographic flood lamps. Of these, mercury vapour arcs, particularly sun lamps, fluorescent sun lamps, and metal halide lamps are most suitable. The time required for the exposure of the photopolymerisable compound will depend upon a variety of factors which include, for example, the individual compound used, the proportion of that compound in the composition, the type of light source, and its distance from the composition. Suitable times may be readily determined by those familiar with photopolymerisation techniques, but in all cases the product after photopolymerisation must still be curable by heating: for this reason, photopolymerisation is carried out at a temperature below that at which curing of the epoxide resin by the heat-activated curing agent becomes substantial.

Suitable heat-activated curing agents include polycarboxylic acid anhydrides, dicyandiamide, complexes of amines, such as ethylamine and trimethylamine with boron trifluoride or boron trichloride, latent boron difluoride chelates, aromatic polyamines such as bis(p-aminophenyl)methane, and imidazoles such as 2-ethyl-4-methylimidazole and 2-phenylimidazole. As already indicated, when the epoxide resin is an N-glycidyl compound, the curing agent is preferably not a boron halide complex or other Lewis acid. The heat-curing agent is usually dissolved or suspended in the liquid composition before irradiation.

The temperatures and duration of heating required for the thermal curing, i.e., for bonding the two surfaces together, and the proportions of curing agent are readily found by routine experimentation and easily derivable from what is already well known concerning the heat-curing of epoxide resins.

The film may be provided with a carrier or a strippable backing sheet, e.g., of a polyolefin or a polyester, or of cellulosic paper having a coating of a silicone as release agent, which is removed before the film is sandwiched between the surfaces to be bonded. Manipulation of the assembly is often easier if the film has a tacky surface. This may be produced by coating the film with a substance which is tacky at room temperature but which cures to a hard, insoluble, infusible resin under the conditions of heat employed to cure the epoxide resin component of the film. However, an adequate degree of tackiness often exists without additional treatment, especially if the epoxide resin in the film is not too far advanced.

Suitable metal adherends include aluminium, stainless steel and copper.

The following Examples illustrate the invention. Temperatures are in degrees Celsius and, unless otherwise indicated, parts are by weight. Epoxide contents were determined by titration against a 0.1N solution of perchloric acid in glacial acetic acid in the presence of excess of tetraethylammonium bromide, crystal violet being used as the indicator. All lap shear strengths quoted are the mean of three results and were determined according to British Ministry of Aviation, Aircraft Materials Specification DTD 5577, November 1965.

Materials used in the Examples include the following:

EPOXIDE RESIN I denotes a solid diglycidyl ether of 2,2-bis(p-hydroxyphenyl)propane which had been advanced with the same bisphenol, of epoxide content 2.3 equiv./kg.

EPOXIDE RESIN II denotes a solid polyglycidyl ether of an o-cresol-formaldehyde novolak (molar ratio 1:0.86), of epoxide content 4.3 equiv./kg.

EPOXIDE RESIN III denotes a liquid diglycidyl ether of 2,2-bis(p-hydroxyphenyl)-propane, of epoxide content 5.3 equiv./kg.

EPOXIDE RESIN IV denotes a solid diglycidyl ether of 2,2-bis(p-hydroxyphenyl)-propane which had been advanced with 2,2-bis(3,5-dibromo-4-hydroxyphenyl)propane, of epoxide content 2.1 equiv./kg.

EPOXIDE RESIN V denotes diglycidyl terephthalate, of epoxide content 7.05 equiv./kg.

EPOXIDE RESIN VI denotes bis(p-diglycidylamino)phenyl)methane, of epoxide content 7.5 equiv./kg.

ACRYLATE A

Phenyl glycidyl ether of epoxide content 6.13 equiv./kg (100 g), 0.3 g of tetramethylammonium chloride, and 0.2 g of hydroquinone were stirred at 120° and 44.1 g of acrylic acid (1 equiv. per epoxide equiv.) was added over 15 minutes. The mixture was stirred at 120° for a further hour, by which time its epoxide content had fallen to 0.9 equiv./kg, to furnish Acrylate A.

ACRYLATE B

This acrylate was prepared similarly. Phenyl glycidyl ether (750 g), 2.25 g of tetramethylammonium chloride, and 1.5 g of hydroquinone were stirred at 120° and 332.7 g of acrylic acid (1 equiv. per epoxide equiv.) was added over 30 minutes. The mixture was stirred at 120° for a further 1½ hours, by which time its epoxide content had fallen to 0.63 equiv./kg.

Acrylates A and B are substantially 1-phenoxy-2-hydroxypropyl acrylate.

ACRYLATE C n-Butyl glycidyl ether of epoxide content 7.65 equiv./kg (50 g), 0.15 g of tetramethylammonium chloride, and 0.05 g of hydroquinone were stirred at 120° and 27.6 g of acrylic acid (1 equiv. per epoxide equiv.) was added over 15 minutes. The mixture was stirred for a further 3 hours, by which time its epoxide content had fallen to 0.6 equiv./kg. The product, Acrylate C, is substantially 1-n-butoxy-2-hydroxypropyl acrylate.

ACRYLATE D is 2,2-dimethylpropane-1,3-diol diacrylate.

ACRYLATE E is 1,1,1-trimethylolpropane triacrylate.

SORBATE A

To a stirred mixture of 100 g of a poly(oxyethylene)glycol, average molecular weight 200, 110 g of triethylamine, and 50 ml of toluene at room temperature was added 130.5 g of sorboyl chloride over 30 minutes. The mixture was stirred at 80° for 1 hour, cooled to room temperature, and then filtered, and the solvent was distilled off under reduced pressure to leave the poly(oxyethylene)disorbate.

PHENOXY RESIN I denotes a commercially available phenoxy resin, made by copolymerisation of 2,2-bis(4-hydroxyphenyl)propane and its diglycidyl ether, and having an average molecular weight of 30,000.

EPOXIDE-ACRYLATE I denotes a mixture of a dual-functional substance, 2-(p-(glycidyloxyphenyl)-2-(p-(3-acryloyloxy-2-hydroxypropoxy)phenyl)propane, 2,2-bis(p-(glycidyloxy)phenyl)propane, i.e., an epoxide resin, and 2,2-bis(p-(3-acryloyloxy-2-hydroxypropoxy)phenyl)propane.

The mixture was prepared in the following way:

The diglycidyl ether of 2,2-bis(4-hydroxyphenyl)propane of epoxide content 5.3 equiv./kg (500 g), 1.5 g of trimethylammonium chloride, and 1.5 g of 2,6-di-tert.-butyl-p-cresol were stirred at 100° while 95.4 g of acrylic acid (0.5 equiv. per epoxide equiv.) was added over 1 hour. The mixture was stirred at 100° for a further 30 minutes, by which time its epoxide content had fallen to 2.32 equiv./kg.

EXAMPLE I

A liquid composition, prepared by mixing 70 parts of Epoxide Resin I, 30 parts of Acrylate A, 4 parts of dicyandiamide, and 1 part of benzil dimethyl acetal, was applied at 50° as a layer 24 μm thick onto paper provided with a coating of a silicone as a release agent. This composition contains approximately 0.6 mole of the epoxide resin per mole of the photopolymerisable compound (the acrylate). The layer was irradiated for 30 seconds using a 400 w metal halide-quartz lamp, emitting predominantly in the 365 nm band, at a distance of 30 cm.

The film was peeled off the paper, cut to size, and sandwiched between two sheets of "Alclad 3L 73" aluminium alloy sheet that had been degreased in trichloroethylene and pickled in chromic acid solution ("Alclad" is a Registered Trade Mark). Overlap joints (1.27 cm) were prepared by pressing the assembly under a pressure of 172 kN/m$^2$ for 1 hour at 170°. The lap shear strength of the joints obtained in this Example, and Examples II to VIII, are recorded in Table I.

EXAMPLE II

The procedure of Example I was repeated, using a composition comprising 40 parts of Epoxide Resin I, 30 parts of Acrylate A, 30 parts of Phenoxy Resin I, 6 parts of dicyandiamide, and 1 part of benzil dimethyl acetal, and the coating being applied to the paper at 35°. This composition contains approximately 0.33 mole of the epoxide resin per mole of the acrylate.

EXAMPLES III–VIII

The procedure of Example II was repeated with the following compositions, the numbers denoting parts by weight, except that the coatings were 100 μm thick and they were applied at 25°.

| | | |
|---|---|---|
| III | Epoxide Resin I | 70 |
| | Acrylate B | 30 |
| | Benzil dimethyl acetal | 1 |
| | Dicyandiamide | 4 |
| IV | Epoxide Resin II | 70 |
| | Acrylate B | 30 |
| | Benzil dimethyl acetal | 1 |
| | Dicyandiamide | 4 |
| V | Epoxide Resin I | 55 |
| | Epoxide Resin III | 7.5 |
| | Acrylate B | 30 |
| | Phenoxy Resin I | 7.5 |
| | Benzil dimethyl acetal | 1 |
| | Dicyandiamide | 5 |
| VI | Epoxide Resin I | 70 |
| | Acrylate C | 30 |
| | Benzil dimethyl acetal | 1 |
| | Dicyandiamide | 4 |
| VII | Epoxide Resin II | 70 |
| | Acrylate C | 30 |
| | Benzil dimethyl acetal | 1 |
| | Dicyandiamide | 4 |
| VIII | Epoxide Resin I | 55 |
| | Epoxide Resin III | 7.5 |
| | Acrylate C | 30 |
| | Phenoxy Resin I | 7.5 |
| | Benzil dimethyl acetal | 1 |
| | Dicyandiamide | 4 |

TABLE I

| Composition | Lap shear strength MN/m$^2$ at 25° C. |
|---|---|
| I | 11.7 |
| II | 10.7 |
| III | 13.0 |
| IV | 12.1 |
| V | 12.1 |
| VI | 30.4 |
| VII | 25.4 |
| VIII | 28.0 |

EXAMPLE IX

The procedure of Examples III—VIII was repeated with the following composition, except that it was irradiated for 1 minute:

| | |
|---|---|
| Epoxide Resin I | 42 |
| Epoxide Resin II | 28 |
| Acrylate D | 30 |
| 2-Phenylimidazole | 1 |

-continued

| | |
|---|---|
| Benzoin n-butyl ether | 1 |

The joints were prepared for 1 hour at 150° under a pressure of 350 kN/m², when the lap shear strength was 11.5 MN/m². After the joints had been post-cured at 180° for 1 hour, the lap shear strength rose to 14.2 MN/m².

EXAMPLE X

The procedure of Examples III–VIII was repeated with the following composition, except that it was irradiated for 15 minutes:

| | |
|---|---|
| Epoxide Resin IV | 70 |
| Sorbate A | 30 |
| Boron trifluoride-monoethylamine | 3 |
| Michler's ketone | 1 |

The joints were pressed for 1 hour at 150° under a pressure of 350 kN/m², when the lap shear strength was 7.1 MN/m². After the joints had been postcured for 1 hour at 180°, the lap shear strength rose to 9.2 MN/m².

EXAMPLES XI–XIII

The procedure of Example I was repeated with the following compositions, the numbers denoting parts by weight, except that the coatings were 75 μm thick and they were applied at 25°. Overlap joints were prepared as described in Example I but they were pressed for 1 hour at 180° under a pressure of 350 kN/m².

| | | |
|---|---|---|
| XI | Epoxide resin V | 50 |
| | Acrylate D | 50 |
| | Benzil dimethyl acetal | 1 |
| | Dicyandiamide | 4 |
| XII | Epoxide resin VI | 70 |
| | Acrylate E | 30 |
| | Benzil dimethyl acetal | 1 |
| | Dicyandiamide | 4 |
| XIII | Epoxide-Acrylate I | 70 |
| | Acrylate A | 30 |
| | Benzil dimethyl acetal | 1 |
| | Dicyandiamide | 4 |

Compositions XI, XII, and XIII gave lap shear strengths of 8.2, 2.9 and 3.9 MN/m² respectively.

What is claimed is:

1. A method for bonding together two surfaces selected from the group consisting of metals, ceramics, and wood, which comprises
   (i) applying to a carrier or strippable backing sheet, in the absence of a substance which gives rise to a substantial degree of photoinduced polymerisation through consumption of epoxide groups, a layer of (liquid) composition (consisting of)
   an epoxide resin containing at least one group of the formula

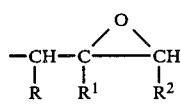

directly attached to an atom of oxygen, nitrogen or sulfur, where either R and R² each represent a hydrogen atom in which case R¹ denotes a hydrogen atom or a methyl group, or R and R² together represent —CH₂CH₂—, in which case R¹ denotes a hydrogen atom,
a photopolymerisable compound which is an acrylic ester containing at least one group of the formula $$CH_2=C(R^3)COO—$$

where R³ is a hydrogen, chlorine or bromine atom, or a C₁–C₄ alkyl group,
and a heat-activated curing agent for epoxide resins selected from the group consisting of polycarboxylic acid anhydride, dicyandiamide, an imidazole, a latent boron difluoride chelate, an aromatic polyamine and a complex of an amine with boron trifluoride or with boron trichloride,
   (ii) exposing said layer to actinic radiation until the composition solidifies to form an essentially solid, continuous, self-supporting adhesive film due to photopolymerisation of the said photopolymerisable compound while the epoxide resin remains substantially in the thermosettable state,
   (iii) removing the said solid film from the carrier or strippable backing sheet,
   (iv) sandwiching the said solid film between, and in contact with, the two surfaces, the said solid film, and
   (v) heating the assembly to cure the epoxide resin.

2. A method according to claim 1, in which the carrier or strippable backing sheet is of a polyolefin or a polyester, or of cellulosic paper having a coating of a silicone release agent.

3. The method of claim 1, in which the molar ratio of epoxide resin to photopolymerisable compound is from 10:1 to 1:10.

4. The method of claim 1, in which the photopolymerisable compound is photopolymerised through a free-radical chain reaction.

5. The method of claim 1, in which the photopolymerisable compound has one ethylenic linkage, or, providing they are unconjugated, at least two.

6. The method of claim 1, in which the photopolymerisable compound is 2,2-dimethylpropane-1,3-diol diacrylate or of one of the formulae

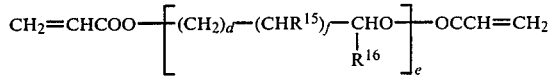

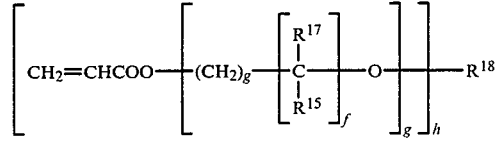

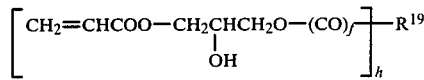

and $$CH_2=CHCOOR^{21}$$

where
R¹⁵ denotes —H, —OH, or —OOCCH=CH₂,
R¹⁶ denotes —H, —CH₃, —C₂H₅, —CH₂OH, or —CH₂OOCCH=CH₂, $R^{17}$ denotes —H, —Cl, —CH$_3$, or —C$_2$H$_5$, $R^{18}$ denotes an organic radical of valency h, linked through a carbon atom or carbon atoms thereof to the indicated h terminal oxygen atom or atoms, $R^{19}$ denotes an organic radical of valency h, linked through a carbon atom thereof, other than the carbon atom of a carbonyl group, $R^{20}$ denotes CH$_3$—, C$_2$H$_5$—, or CH$_2$=CHCOOCH$_2$—, $R^{21}$ denotes an alkyl group of 1 to 6 carbon atoms, a monohydroxyalkyl group of 1 to 6 carbon atoms, or a dialkylaminoalkyl group, d is an integer of from 1 to 8, e is an integer of from 1 to 20, f is zero or 1, g is zero or a positive integer, providing that f and g are not both zero, and h is 1, 2, 3, or 4.

7. The method of claim 1, in which the photopolymerisable compound does not contain a 1,2-epoxide group.

8. The method of claim 1, in which the said liquid composition which is to be converted into an essentially solid continuous film also contains a dual-functional substance having in the same molecule at least one 1,2-epoxide group and at least one dissimilar group through which the substance is polymerised by means of actinic radiation.

9. The method of claim 8, in which the dual-functional substance contains in the same molecule at least one group of formula

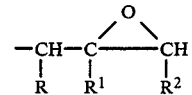

directly attached to an atom of oxygen, nitrogen, or sulfur, and at least one group of formula

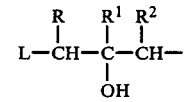

directly attached to an atom of oxygen, nitrogen, or sulfur, where

L is the monovalent photopolymerisable residue of a substance after removal of a hydrogen atom attached directly to an oxygen, nitrogen, or sulfur atom, and either R and $R^2$ each represent a hydrogen atom, in which case $R^1$ denotes a hydrogen atom or a methyl group, or R and $R^2$ together represent —CH$_2$CH$_2$—, in which case $R^1$ denotes a hydrogen atom.

* * * * *